US009236999B2

(12) United States Patent
Alapuranen (10) Patent No.: US 9,236,999 B2
(45) Date of Patent: Jan. 12, 2016

(54) COGNITIVE MOBILE TIME DIVISION DUPLEX AD-HOC NETWORK (71) Applicant: Pertti Alapuranen, Deltona, FL (US)

(72) Inventor: Pertti Alapuranen, Deltona, FL (US)

(73) Assignee: XG TECHNOLOGY, INC., Sarasota, FL (US)

( * ) Notice: Subject to any disclaimer, the term of this patent is extended or adjusted under 35 U.S.C. 154(b) by 411 days.

(21) Appl. No.: 13/646,839

(22) Filed: Oct. 8, 2012

(65) Prior Publication Data
US 2013/0089011 A1 Apr. 11, 2013

Related U.S. Application Data (60) Provisional application No. 61/545,940, filed on Oct. 11, 2011.

(51) Int. Cl.
*H04L 5/14* (2006.01)
*H04L 5/00* (2006.01)
*H04W 84/18* (2009.01)
*H04W 40/24* (2009.01)

(52) U.S. Cl.
CPC ............... *H04L 5/1484* (2013.01); *H04L 5/005* (2013.01); *H04L 5/0028* (2013.01); *H04W 40/24* (2013.01); *H04W 84/18* (2013.01)

(58) Field of Classification Search
CPC ..... H04L 5/0078; H04L 5/1484; H04L 5/005; H04L 5/0028; H04W 84/20; H04W 72/0446
USPC ......... 370/276, 294, 310, 315, 316, 319, 321, 370/326, 328, 338, 345, 464, 465, 468; 455/403, 422.1, 450
See application file for complete search history.

(56) References Cited

U.S. PATENT DOCUMENTS

| 7,586,867 | B2* | 9/2009 | Lin .............................. 370/321 |
| 8,184,658 | B1* | 5/2012 | Chowdhuri et al. .......... 370/466 |
| 2005/0013386 | A1* | 1/2005 | Ojard ............................ 375/316 |
| 2007/0109989 | A1 | 5/2007 | Nakagawa et al. |
| 2008/0317047 | A1 | 12/2008 | Zeng et al. |
| 2009/0040974 | A1* | 2/2009 | Goldhamer ................... 370/329 |
| 2009/0279487 | A1 | 11/2009 | Reumerman et al. |
| 2009/0285088 | A1* | 11/2009 | Feng et al. .................... 370/216 |
| 2010/0074232 | A1* | 3/2010 | Hwang ......................... 370/336 |
| 2010/0260085 | A1* | 10/2010 | Wang et al. ................... 370/311 |
| 2010/0271948 | A1* | 10/2010 | Challapali et al. ............ 370/235 |

* cited by examiner

*Primary Examiner* — Obaidul Huq
(74) *Attorney, Agent, or Firm* — Dennis L. Cook, Esq.

(57) ABSTRACT

A cognitive MANET system is disclosed that uses TDD (Time Division Duplexing) and TDMA MAC to maintain routes that allow delivery of adequate bandwidth for applications resulting in an efficient way of maintaining information on neighboring wireless terminals and access points by using a routing protocol that has a built in slot reservation algorithm.

4 Claims, 8 Drawing Sheets

Superframe Structure

Figure 1: Superframe Structure

Figure 8: Route Request to node D using CBA.

Figure 9: Route Request using contention access slots.

COGNITIVE MOBILE TIME DIVISION DUPLEX AD-HOC NETWORK

CROSS-REFERENCE TO RELATED APPLICATION

The present application claims the benefit of previously filed Provisional Patent Application, Ser. No. 61/545,940 filed Oct. 11, 2011.

FIELD OF THE INVENTION

This invention applies to the field of cognitive radio systems and describes a cognitive MANET system that uses TDD (Time Division Duplexing) and TDMA MAC to maintain routes that allow delivery of adequate bandwidth for applications resulting in an efficient way of maintaining information on neighboring wireless terminals and access points by using a routing protocol that has a built in slot reservation algorithm.

BACKGROUND OF THE INVENTION

A Mobile Ad-Hoc Network (MANET) is a distributed system that consists of mobile nodes that can organize in an Ad-Hoc manner. These types of networks have been historically implemented for tactical and commercial use.

Recent developments in 4G and beyond technologies are helping to integrate different wireless and wired systems using Internet Protocol (IP). The IP protocol allows a core network to maintain compatibility even when transport layers evolve. The same IP based networking approach can be effectively used to create wireless networks that form when devices are in proximity. These types of networks do not necessary need infrastructure as they are created when intelligent mobile devices cooperatively create a network on their own.

The traditional MANET technology can be improved by combining it with a Cognitive Radio (CR) technology. Cognitive MANET networks use cognitive radio terminals to relay traffic. These types of systems can intelligently decide on what frequencies they are operating, and can modify operating parameters dynamically.

This invention describes a cognitive MANET system that uses TDD (Time Division Duplexing) and TDMA MAC. To maintain routes that allow delivery of adequate bandwidth for applications a cognitive MANET system needs an efficient way of maintaining information on neighboring wireless terminals and access points. A cognitive system can intelligently decide on what band and frequency in a band to use. The radio channel varies dynamically and terminals can suffer from interference due to hidden and exposed terminal phenomena. This problem is mitigated using a routing protocol that has a built in slot reservation algorithm.

BRIEF SUMMARY OF THE INVENTION

This invention describes a cognitive MANET system that uses TDD (Time Division Duplexing) and TDMA MAC to maintain routes that allow delivery of adequate bandwidth for applications resulting in an efficient way of maintaining information on neighboring wireless terminals and access points by using a routing protocol that has a built in slot reservation algorithm.

For a fuller understanding of the nature and objects of the invention, reference should be made to the following detailed description taken in connection with the accompanying drawings.

DESCRIPTION OF THE DRAWINGS

For a fuller understanding of the nature and objects of the invention, reference should be made to the accompanying drawings, in which.

DETAILED DESCRIPTION OF THE INVENTION

An xMax Network is a rapidly deployable communication network that allows the network to provide wireless voice and broadband data services to their subscribers/end-users. The overall network architecture is similar to a typical cellular network, however, it is also flexible enough to provide both a smaller footprint and network coverage as well as agile enough to provide Mobile Ad-Hoc Networking.

The network is comprised of the following network elements:

Mobile Switching Center (xMSC)—Core Network that acts as the gateway to the Public Internet.
Base Stations (BSN) or Access Points (AP)—Bridges the wireless network to the Core Network.
xMax Modems (xMod)—Mobile devices that the End-Users use to connect their smart phones or other computing devices to the xMax network via a Wi-Fi or other industry standard interface.

The terminology in this document loosely follows the terminology used in AODV routing proposal, RFC 3561 [Perkins, et. al. July 2003] as follows:

Active route. A route towards a destination that has a routing table entry that is marked as valid. Only active routes can be used to forward data packets.

Broadcast. Broadcasting means transmitting to the broadcast MAC address, FF:FF:FF:FF:FF. A broadcast packet may not be blindly forwarded, but broadcasting is useful to enable dissemination of AODV messages throughout the ad hoc network.

Destination. A MAC address to which data packets are to be transmitted. Same as "destination node". A node knows it is the destination node for a typical data packet when its address appears in the appropriate field of the MAC header. Routes for destination nodes are supplied by action of the AODV protocol, which carries the MAC address of the desired destination node in route discovery messages.

Forwarding node. A node that agrees to forward packets destined for another node, by retransmitting them to a next hop that is closer to the unicast destination along a path that has been set up using routing control messages.

Forward route. A route set up to send data packets from a node originating a Route Discovery operation towards its desired destination.

Invalid route. A route that has expired, denoted by a state of invalid in the routing table entry. An invalid route is used to store previously valid route information for an extended period of time. An invalid route cannot be used to forward data packets, but it can provide information useful for route repairs, and also for future RREQ messages.

Originating node. A node that initiates an AODV route discovery message to be processed and possibly retransmitted by other nodes in the ad hoc network. For instance, the node initiating a Route Discovery process and broadcasting the RREQ message is called the originating node of the RREQ message.

Reverse route. A route set up to forward a reply (RREP) packet back to the originator from the destination or from an intermediate node having a route to the destination.

Sequence number. A monotonically increasing number maintained by each originating node. In AODV routing protocol messages it is used by other nodes to determine the freshness of the information contained from the originating node.

Valid route. See active route.

To create an Ad-Hoc network mobile terminal devices have to be able to exchange data directly with each other. To do this mobile terminals and infrastructure devices (APs) need to be able to dynamically discover each other and dynamically establish links that can be used for data transfer. Typically Ad-Hoc networking protocols are symmetric, i.e. terminals appear similar to any other device in a network. For example, CSMA/CA MAC protocol that is used in 802.11a/b/g/n allows any device to reserve a channel thus making it straightforward to add Ad-Hoc networking on it.

The rigid coordination of TDD MAC makes TDD Ad-Hoc networking challenging because the network consists of master and slave devices, i.e. base station type devices that control the channel access and slave devices that operate according to scheduling instructions established by the base station devices. The Ad-Hoc protocol of this disclosure (xMax Ad-Hoc protocol) solves the problem by creating a super frame consisting of two frame times, allowing symmetric configuration, i.e. each device can be both master and slave. Additionally each of the frame times can communicate on different channels thus increasing network capacity. In CSMA systems the use of different channels is complicated due to the uncoordinated nature of the network, i.e. devices cannot tune to different channels because they do not know ahead of time when a data packet can be transmitted to them.

The TDD Ad-Hoc networking protocol can be divided into three major parts; the routing engine, neighbor discovery, and the frame and slot allocation system. The routing engine is based on AODV while neighbor discovery, frame and slot allocation methods are unique to the disclosed system.

The switching ("L2 routing") is based on Ad-Hoc On-Demand Distance Vector (AODV) due to its scalability. This protocol is described, for example, in RFC 3561 [Perkin's, et. al. July 2003].

Routing protocols can be classified depending on the way routes are discovered and also depending on when routes are discovered. For example, link state and distance vector based algorithms use different algorithms to find routes. Additionally algorithms can be divided to proactive and on-demand (reactive) algorithms. Proactive algorithms establish routes before they are needed while reactive (on-demand) algorithms establish routes when they are needed.

Route discovery is based on query and reply cycles. Route information is stored in all intermediate nodes along the route in the form of route table entries. AODV uses many control packets, including a routing request message (RREQ) that is broadcast by a node requiring a route to another node, and a routing reply message (RREP) that is sent back to the source of RREQ. A route error message (RERR) is sent to notify other nodes of the loss of the link.

AODV is reactive, i.e. when a source node needs a route to a destination for which it does not have a route it transmits a RREQ (Route Request) across the network. Nodes receiving this packet update their information for the source node and set up a backward index to the source node in the routing table. A node that receives a RREQ sends a RREP (Route Reply) if it is the destination or if it has a route with a greater sequence number to the destination. Otherwise the node retransmits the RREQ. The sequence number scheme is critical in making sure that routing loops are not created.

The framing protocol structure of this disclosure adds a concept of framing and channelization to the routing algorithm. Route request and reply messages have additional fields for frame type and channel information that is used by nodes to allocate TDD frames and to select channels. A node can be master or slave, i.e. coordinate or be coordinated regarding time slot allocations. A node that is a master coordinates channel access over an area that can be determined based on range of hello messages received. For this reason TDD information in the system is processed for two hops, i.e. previous and next nodes.

The routing table contains the following information:
Destination MAC address;
Next hop MAC address;
TDD framing, channel information for destination;
Number of hops;
Destination sequence number;
Active neighbors for this route;
Expiration time for this route table entry; and,
List of precursor nodes for each Destination.

The neighbor table contains:
Neighbor MAC address;
RF channel;
TDD framing information, channel information; and,
Metric (available capacity based on neighbors using same master).

When a route is not available for the destination, a route request message (RREQ) is sent using an expanding ring technique throughout the network. The message contains an additional TDD info field for frame timing and available channels at the request node. The list is ordered so that the first element proposes the most desired frame timing, i.e. master/slave mode, most desirable channel followed by potential master/slave and channel combinations. At a minimum the TDD info contains at least one element when sent by an original requestor and a minimum of two elements when forwarded, i.e. one for the node forwarding and one for the hop before.

The TDD info is:
Element 1: Master/slave information, frame type (1,2), Desired channel.
Element 2: Master/slave information, frame type (1,2), Desired channel.
Element 3 prev: Master/slave information, frame type (1,2), Desired channel for ONE HOP earlier.
Element 4 prev: Master/slave information, frame type (1,2), Desired channel for ONE HOP earlier.

If a node is the destination, or has a valid route to the destination, it unicasts a route reply message (RREP) back to the source. This message has an additional TDD info that contains a list of possible Master/slave information of frame type (1, 2) and desired channel combinations for the node that forwarded the message back. This may or may not be the same as the destination node.

Hello messages are used to detect neighboring nodes. These messages are transmitted using a random interval and slot in a frame that is not used by the frame for any other purpose. Any device that is not transmitting a hello packet on that frame shall be listening for hello messages from other devices. Note: the preferred embodiment frame uses a special slot (last CBT in xMax frame) for transmitting and receiving hello slots. The Hello message has a GPS flag for assisting with network synchronization. When a device is locked to a GPS timing source beacon hello messages set the GSP flag to '1'. A HELLO message may contain TDD information. For example if a node is a slave and does not use frame for master operation it may add this with a list of channels that are not used in its neighborhood.

In a TDD system a device discovers neighbors by listening for super frame beacons. After finding a master a device transmits BEACON messages by periodically using random access slots as defined in the physical layer. If a device cannot find any beacons on a channel then it can become a master and start transmitting beacons on that channel.

When device is slave and is connected to a master it can request a "proxy hello" from a master, i.e. list of all devices that are connected to master. Any device on this list is a potential next hop. An important part of the proxy hello message is to get information on what frequencies the devices are communicating. The list of devices with associated frequency information allows a fast method to find any beacons sent on those channels by neighboring devices. If the device is a slave then a proxy hello message can be used to trigger transmission of a beacon on a channel that is specified in the message.

A SCAN message is used to inform slave devices by a master that the master is not communicating for the following N frame times. For example a device that wants to scan for beacons in a neighborhood or another channel can send a SCAN message to terminals connected to it allowing terminals to know that links did not break.

A node sends a RREQ when it determines that it needs a route to a destination node and does not have one available. This can happen also if TDD frame and channel allocation needs to be changed for any reason. The TDD info field in a RREQ message contains desired frame type and channel configurations, followed by other less desired combinations in descending order. These are used by receiving nodes to compute the potential for them to relay traffic. For example, a node may indicate that it wants to be master in frame 2 on channel 3 and creates this as a first entry. Two nodes may receive a request and one node may be able to accommodate this combination without impact while the other does not.

When a reverse route is created or updated the node adds its available framing and timing into TDD info list on routing reply message (RREP) and removes information from the list that is for nodes before the sender of the message. (i.e., more than 1 hop earlier).

Once created, the RREP is unicast to the next hop toward the originator of the RREQ, as indicated by the route table entry for that originator.

The TDD info computation is done for each available channel for next and previous hops. The channel is marked to not be used for frame 1,2 or either as slave or master.

The allocation rules for channel, frame tuple are:
Rule 1: Channel and frame combination cannot be used if neighbor detects traffic on it above a threshold RSSI and neighbor is not master nor slave. A typical threshold for RSSI is −62 dBm.
Rule 2: Channel and frame combination can be slave only if neighbor is a slave and node itself is not master.
Rule 3: Channel and frame combination can be slave only to neighbor N if neighbor N is master.
Rule 4: Channel and frame combination that is used by a previous node to a neighbor where neighbor is not master cannot be used. If neighbor is master then it is covered by rule 3.

An intermediate is a node that receives messages and updates the forward route. The intermediate node also adds its available framing and timing into the TDD info list allowing the next node to compute TDD framing.

Due to the TDD framework the system has to dynamically change the frame assignment to operate in an Ad-Hoc network. The disclosed super frame is divided into two 20 ms frames. During a pure infrastructure mode the super frame consists of two downlink and two uplink parts. When Ad-Hoc relaying is done the system can reconfigure the second frame with inversed operation, i.e. able to transmit when next hop device is receiving. This effectively allows a mobile terminal to become a simultaneous mobile terminal and Access Point.

Figure 1:
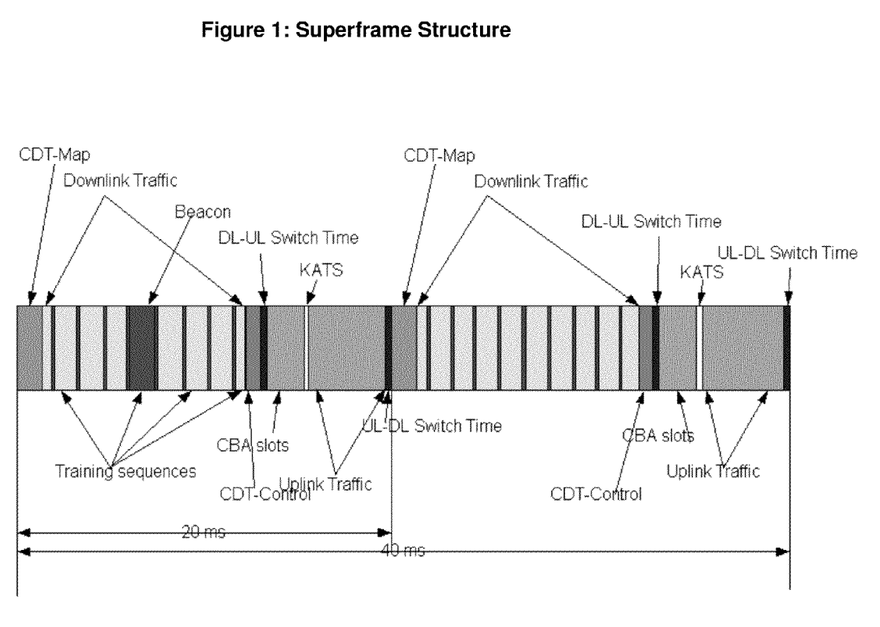
FIG. 1 is a diagram showing the super-frame structure.

The super frame as shown in FIG. 1 is 40 ms long in time and is logically divided into two 20 ms segments. The smallest unit of time from a scheduling perspective is one symbol period (approx. 86 us).

Nodes synchronize to either a GPS signal or to median timing of master devices they can receive. If a device is locked to a GPS signal a special GPS flag bit is set in the beacon or hello messages it transmits. When receiving the device can use the GPS bit to decide what timing information is reliable. If a device receives any messages with GPS bit set then only those messages can be used to establish timing. If no message has the GPS timing bit set then all beacon and hello messages are used for timing estimates. A node can determine connectivity by listening for packets from its set of neighbors. Whenever a node receives a Hello message from a neighbor, the node should make sure that it has an active route to the neighbor, and create one if necessary.

Figure 2:
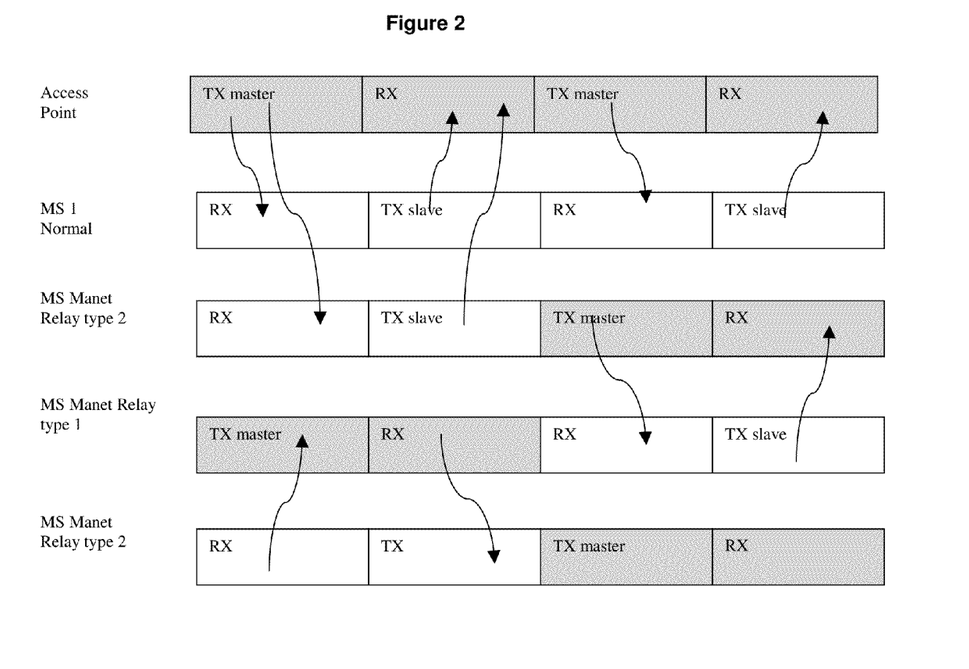
FIG. 2 is a diagram showing devices communicating.

FIG. 2 shows different types of devices communicating. A device type defines whether a device behaves as master or slave and on what part of the super frame.

The system of the preferred embodiment can consist of up to four types of logical devices: Access Point, Mobile Station and type 1 or type 2 relays. Type 1 and 2 relays behave as a mobile station on one-half of the super frame (i.e. one up-down frame time) and as an AP for the second half. Type 1 has the first part as master while type 2 has the second part as master. The routing protocol has to decide the timing of the mobile station by choosing if the station is type 1 or 2 based on available neighbors and routes.

The benefit of the described system is that the capacity does not degrade over a large number of hops after the first hop. The structure can handle real-time traffic; however, it does not dynamically adjust to up-down link load differences as ½ of the time is always up or down link time. The system can use multiple channels thus having high capacity when a single wide channel is not available.

To find a route to a destination the system uses expanding ring search. The expanding ring search is done in two phases. When a source requires a route to a destination a RREQ is sent to the "best" AP on a channel that has the "best metric" based on throughput estimate, i.e. available unused capacity. The route request is sent only to neighbors identified based on information from HELLO and proxy HELLO messages.

If an AP does not return RREP in a predetermined time the system switches to an Ad-Hoc mode. In Ad-Hoc mode devices are either type 1 or type 2 devices or APs. A device can choose which type device it is based on routing RREPs. AP type devices can operate only if there is a backhaul capability on another band or wired connection available for them.

Figure 3:
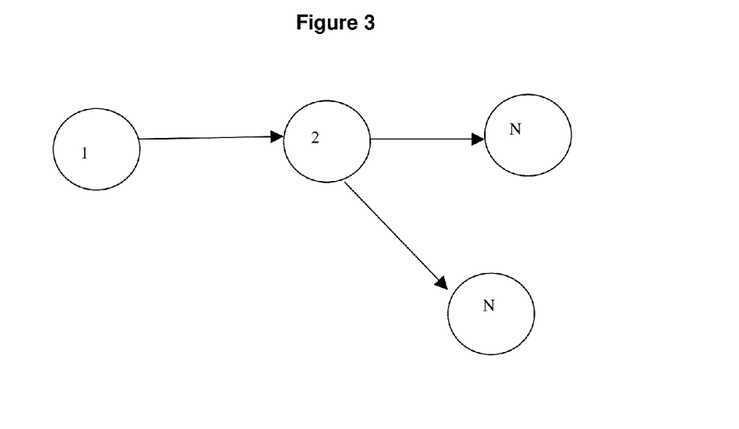
FIG. 3 is a diagram showing a system topography.
Figure 4:
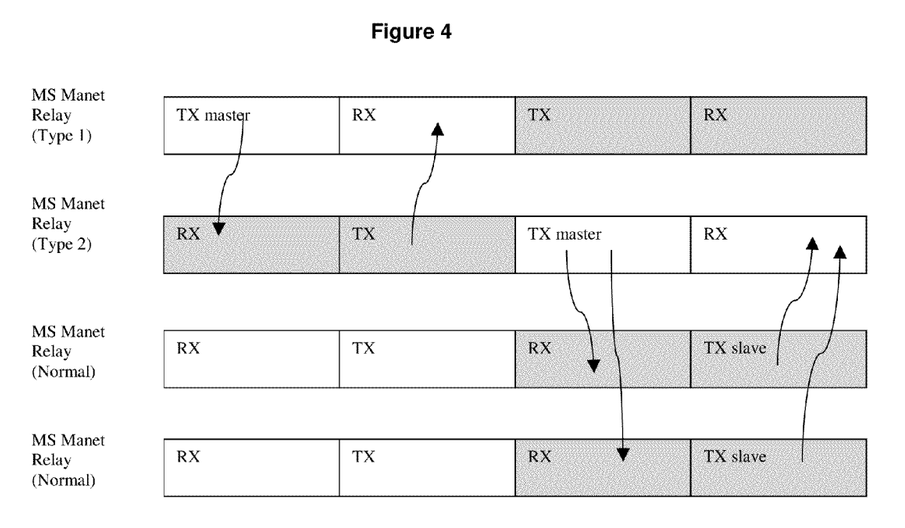
FIG. 4 is a diagram showing possible frame allocation.

FIG. 3 illustrates a simple topology where 3 stations are communicating with a root node. FIG. 4 shows one possible frame allocation for the topology.

Figure 5:
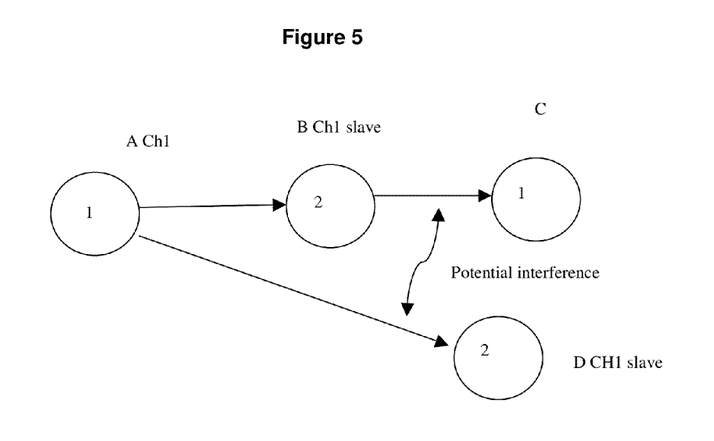
FIG. 5 is a diagram showing another system topography.

Another topology is shown in FIG. 5. One of the leaf nodes is of a different type so that it can directly communicate with the root node.

Figure 6:
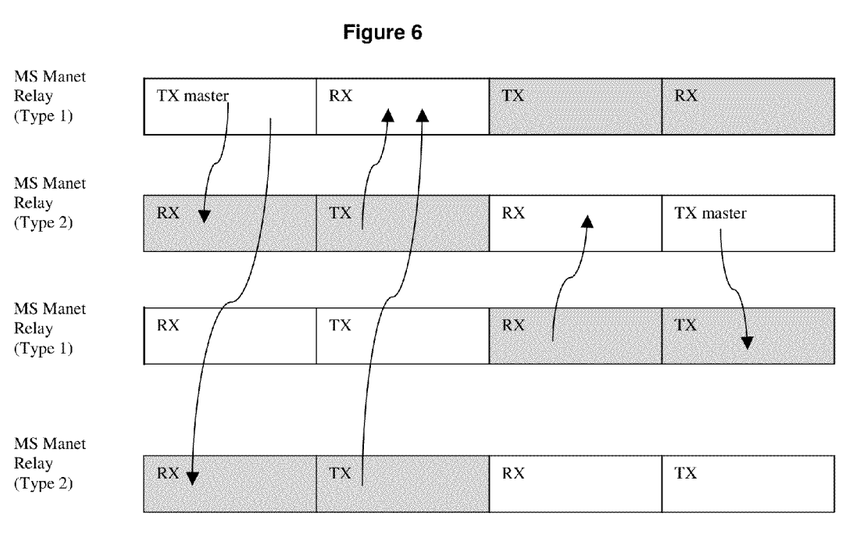
FIG. 6 is a diagram showing possible frame allocation.

Each device can choose the type of operation for each of the individual parts of the super frame. This allows the leaf nodes to communicate directly in the FIG. 5. FIG. 5 shows a situation where there is a potential interference with TDD systems if the protocol does not handle channelization properly. FIG. 6 shows one possible frame allocation for the topology. The system uses information in RREQ to choose frame and channel. For example, if node D is joining last then it sends RREQ with available channels and framing. It has both the frames 1 and 2 available and can be slave on CH1 based on receiving HELLO messages from the neighborhood.

For neighbor discovery a special slot can be introduced into the xMax frame. This slot allows terminals and access points to transmit special HELLO messages.

Hello messages are transmitted periodically using a random interval, typically 100-500 ms. Stations transmit messages, and, when not transmitting during a specific frame, then receive. The neighbor table is populated based on received messages.

The routing system shall always choose a route from equivalent routes that minimizes the amount of frame timing changes or allocations. If the throughput requirement is not met then the system shall send a route request with bandwidth flag B set to try to allocate a route using another channel or frame timing.

Figure 7:
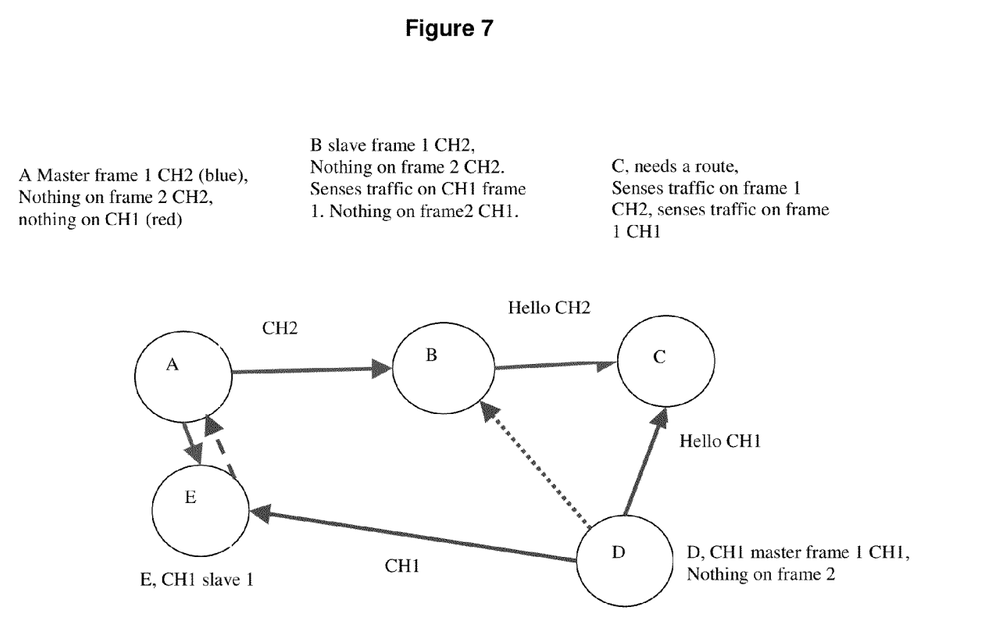
FIG. 7 is a diagram showing an Ad-Hoc network.

FIG. 7 illustrates an AD-Hoc network with 5 nodes and 2 available channels. Node C needs a route to node A. Node C has detected HELLO from node D and B but cannot receive HELLO from any other node.

Node C neighbor table contain the following information:
B CH2, slave 1, frame 2 not used
D CH1, master 1, frame 2 not used Node C fills the route request TDD info field with possible channels,
CH1 frame 1
CH2 frame 1

Node C tunes to CH1 and synchronizes with D and sends RREQ. It then sends a WAIT message with N large enough so that it can send another RREQ to B without waiting for RREP from D. Node C sends another RREQ to node B in a HELLO slot and waits until it gets a RREP.

Figure 8:
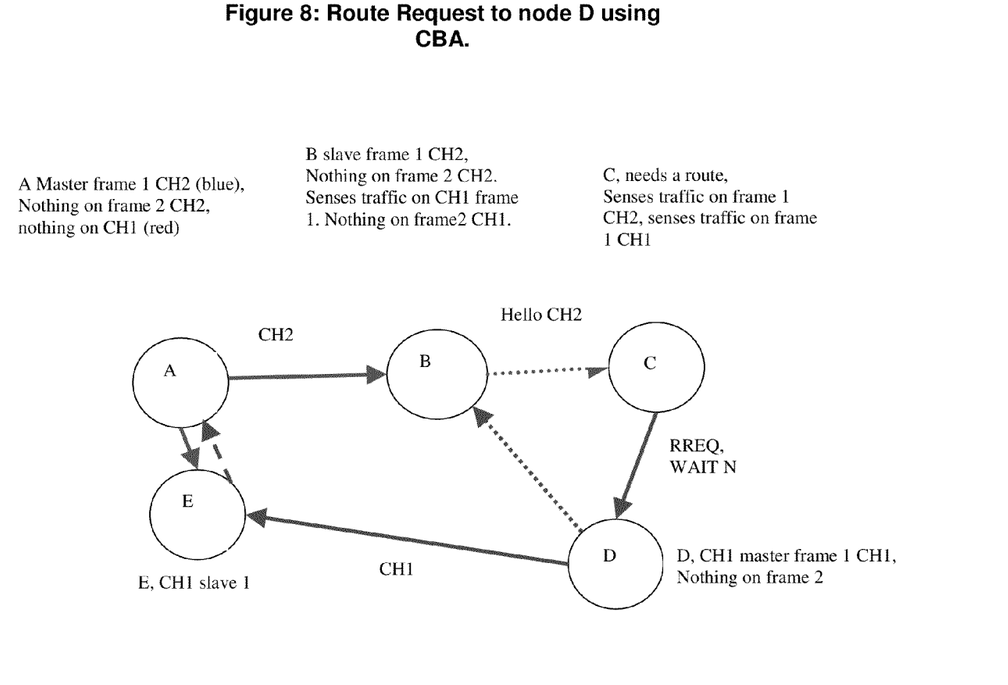
FIG. 8 is a diagram showing an Ad-Hoc network route request.
Figure 9:
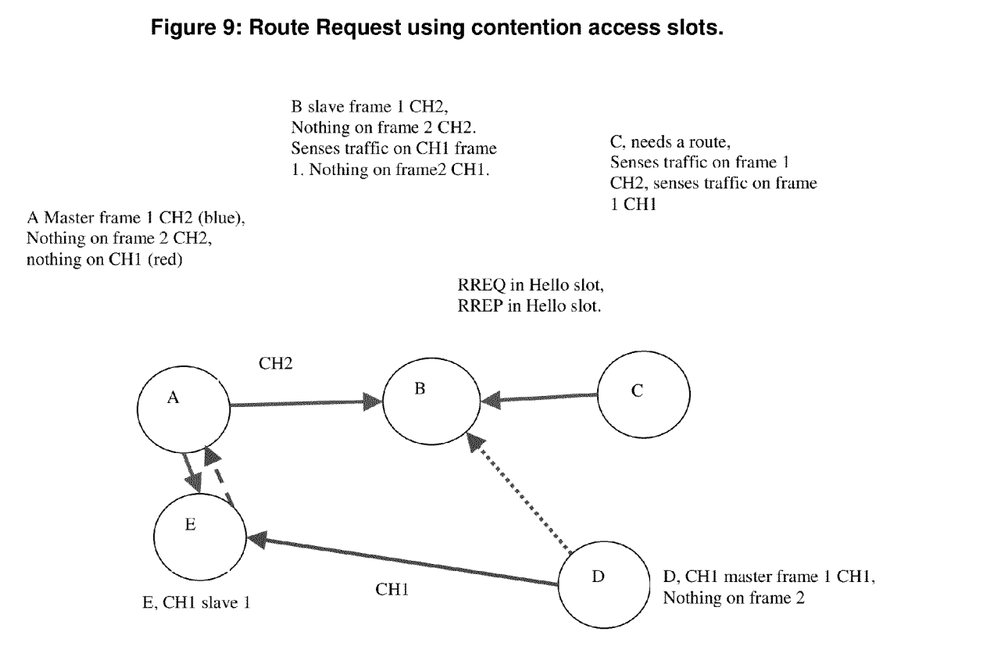
FIG. 9 is a diagram showing an Ad-Hoc network route request.

As shown in FIGS. 8 and 9 the important difference in accessing B and D is that there is more capacity to access D as it is master while B, that is slave, can only use Hello slots. This also explains why RREQ has to contain complete MAC addresses as Hello slots contain broadcast messages only. Node C learns frame timing from node B as it detects HELLO messages from B.

The RREP from node B contains:

| Type 2 | Flags | Source MAC address | Destination MAC address | Destination sequence number | Hop count | Life time | TDD info |
| --- | --- | --- | --- | --- | --- | --- | --- |

Source MAC: B
Destination MAC: C
Hop count: 2
TDD info: CH1 frame 1 traffic, CH1 frame 2 not used, CH2 frame 2 not used, CH2 frame 1 slave
TDD prev info: CH1 frame 1 traffic, CH1 frame 2 not used, CH2 frame 1 master, CH2 frame 2 not used The message indicates that one frame in two channels were available in the previous hop and is also available for the next hop. Node C accesses node D and receives the following RREP:
Source MAC: D
Destination MAC: C
Hop count: 2
TDD info: CH1 frame 1 traffic, CH1 frame 2 not used, CH2 frame 1 not used, CH2 frame 2 not used
TDD prev info: CH1 frame 1 slave, CH1 frame 2 not used, CH2 frame 1 slave, CH2 frame 2 not used.

The RREP message from node D indicates that node D has no information about node B because it has not received HELLO or beacons from B.

Node C can now compute next hop for the route by first combining the messages per channel and applying the following rules:

Rule 1: Channel and frame combination cannot be used if neighbor detects traffic on it above a threshold RSSI and neighbor is not master nor slave. Rule 2: Channel and frame combination can be slave only if neighbor is slave and node itself is not master.

Rule 3: Channel and frame combination can be slave only to neighbor N if neighbor N is master.

Rule 4: Channel and frame combination that is used by a previous node to a neighbor where neighbor is not master cannot be used. If neighbor is master then it is covered by rule 3.

Process node B info first:
CH1 frame 1: Neighbor B detects traffic, cannot be used. (Rule 1).
CH1 frame 2: Not used by B, No traffic Detected. Can be used.
CH2 frame 1: Node B is slave, C can be only slave in CH2 frame 1 if it is not master on it already. (Rule 2).
CH2 frame 2: Not used by B, No traffic detected. Can be used.
Process node D:
CH1 frame 1: Neighbor D is master. Can be slave only to D. (Rule 3).
CH1 frame 2: Not used by D, No traffic detected: Can be used.
CH2 frame 1: Previous node to D is slave, cannot be used. (Rule 4).
CH2 frame 2: Not used by B, No traffic detected. Can be used.

The optimum route would be either through B or D. The algorithm shall first create a link with minimum changes to frame allocation, which in this case is to route through D. This preserves the connectivity. Combining information the node C can choose channel and framing combinations:
CH1 frame 1: Node C can be slave only to communicate with D.
CH1 frame 2: Node C can be slave or master.
CH2 frame 1: Node C cannot be used.
CH2 frame 2: Node C can be slave or master.

A topology of an Ad-Hoc network can change when a node becomes inaccessible or a new "better" relay node is discovered the routing. The most time critical operation is to re-establish an active route after link breaks. In a TDD system reaction may include changing the frame configuration, RF channel, or both.

Figure 10:
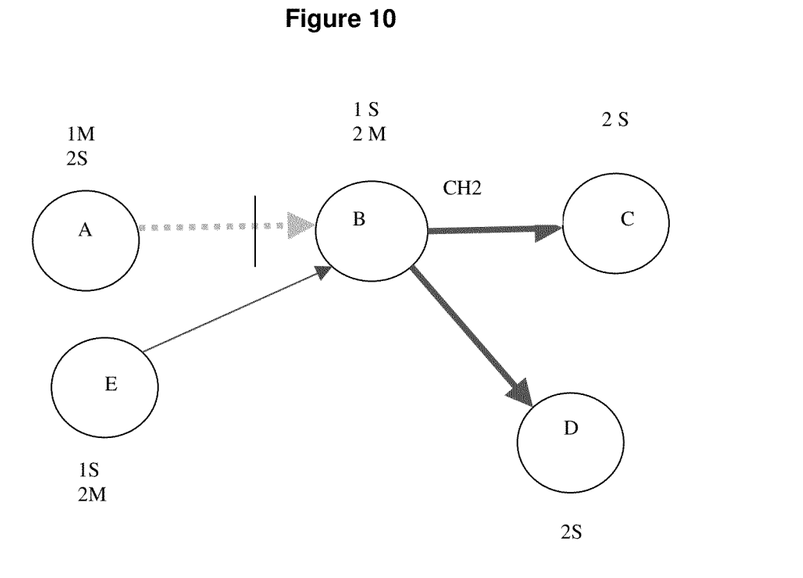
FIG. 10 is a diagram showing a system topography with a route break.

FIG. 10 illustrates topology when one of the routes breaks. Letters M and S indicate master and slave frames. Node A is master on frame 1 and slave on frame 2 while node B is slave on frame 1 and master on frame 2. Each super frame consists of two frames, i.e. frame 1 and 2.

In the figure both nodes A and E are expected to have a route to the final destination that nodes C and D want to reach. If a link between A and B breaks how does node B find a new route?

After detecting a loss on node A the node B will have to inform C and D that the link is broken. After this B has to start scanning both type 1 and type 2 devices. Node B has already sent a virtual HELLO message to node A at some time while it still had link to node A and has neighbor table containing MAC addresses and RF channels and device types of all the devices node A has information about in the direct communication range. Additionally, node B has received beacons from devices in the neighborhood. The device has, however, received a beacon from node E because both are same type, i.e. are receiving and transmitting at the same time. When node B starts scanning for beacons on both frames during a super frame it will receive a beacon from E in less than 40 milliseconds and the neighbor table will get updated. To scan B has to inform C and D that it is scanning for N super frames. The node B has to send a SCAN N frames message to nodes C and D to avoid C and D to send data to B and not getting response thus detecting false link breakage. At this point the routing system will send a route request to node E because there is an entry in the neighbor table.

Figure 11:
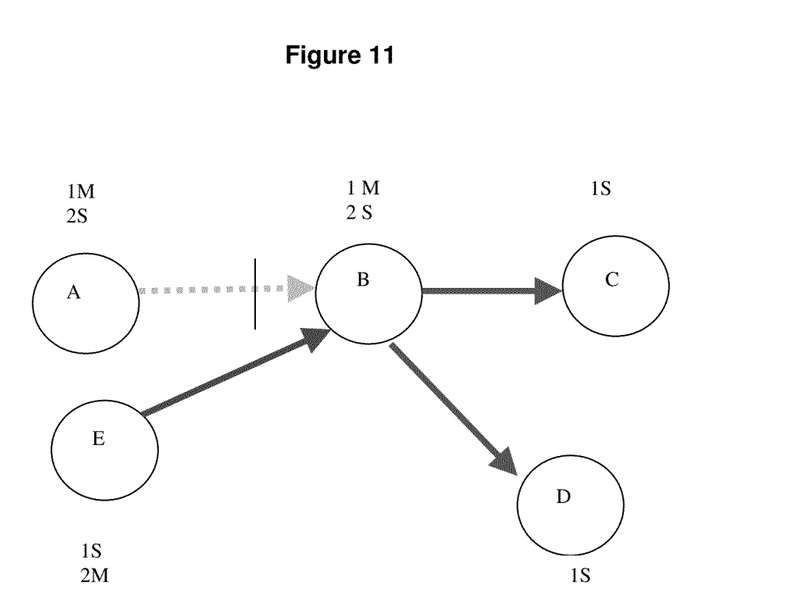
FIG. 11 is a diagram showing a system topography with a route break.

However, the issue is that both E and B are same type and one node needs to change its type. Also, node B has frame 2 operating as master on blue channel while E is frame 2 master on red channel as illustrated in FIG. 11.

After scanning the node B finds node E on the red channel. It can become slave on frame 2 to communicate with node E. However it was using the blue channel on frame 2 and was master on it. To solve the problem B needs to change C and D to type 1 while it can maintain communications on blue channel.

The TDD info field in route request and route reply contains framing and channel information allowing nodes to choose the "best" route.

In summary the following are the key aspects of this invention:

1) A routing algorithm where each node has a routing table that contains TDD frame and channel information for all associated destinations.
2) A routing algorithm where each node has a neighbor table that contains TDD frame and channel information for all potential or used destinations.
3) A routing algorithm that uses route request message with a TDD info field that contains available frame timing and frequency channels at the requesting node. The list is ordered so that first element proposes the most desired frame timing, i.e. master/slave mode, most desirable channel followed by potential master/slave and channel combinations. At minimum the TDD info contains at least one element when sent by original requestor and minimum of two elements when forwarded, i.e. one for the node forwarding and one for the hop before.
4) A TDMA TDD framing protocol that consists of two frames where one frame can be in a master (Base station) mode while the other frame can be in a terminal or relay mode, i.e. the order of transmit and receive parts of the frame can be changed depending on the node a device is communicating with.
5) The TDMA TDD framing in 4 contains a HELLO slot where HELLO (Beacon) message is sent to detect neighboring terminals. This slot is broadcast and can use CSMA-CA or Aloha multiple access protocol.
6) A routing algorithm that uses Proxy HELLO messages. When a device is slave (i.e. the order of TDD RX and TX is the same as it would be for a terminal that communicates with a Base Station or Access Point) and when a node is associated to a master it can request a "proxy hello" from a master device. Proxy Hello is a response to a request containing a list of all the devices that are connected to the master. This allows for a reduction of search for potential neighbors, specifically when multiple channels are used by devices. Any device on this list is a potential next hop. An important part of the proxy hello message is to get information on what frequencies devices are communicating. The list of devices with associated frequency information allows a fast method to find any beacons sent on those channels by neighboring devices. If a device is only a slave then a proxy hello message can be used to trigger transmission of a beacon on a channel that is specified in the message.
7) A routing protocol that includes a message to stop link communications for a period of time. This message is called a SCAN message. The SCAN message is used to inform slave devices by a master that the master is not communicating for the following N frames or seconds. For example, a device that wants to scan for beacons in neighborhood or another channel can send a SCAN message to terminals connected to it allowing terminals to know that links did not break.
8) A routing algorithm with a Route Request Processing method that adds its available framing and timing into TDD info list and removes information from the list that is for nodes before the sender of the message. (i.e. more than 1 hop earlier).
9) A routing and slot allocation method for TDD system where TDD allocation rules for Route Reply processing are the following:
   a) The node adds its available framing and timing into TDD info list allowing the next node to compute TDD framing.
   b) The TDD info computation is done for each available channel for next and previous hops.
   c) The channel is marked to not be used for frame 1, 2, or either as slave or master.

The allocation rules for channel, frame tuple are:

Rule 1: Channel and frame combination cannot be used if neighbor detects traffic on it above a threshold RSSI and neighbor is not master nor slave. Threshold RSSI is approx. −62 dBm.

Rule 2: Channel and frame combination can be slave only if neighbor is slave and node itself is not master.

Rule 3: Channel and frame combination can be slave only to neighbor N if neighbor N is master.

Rule 4: Channel and frame combination that is used by a previous node to a neighbor where neighbor is not master cannot be used.

TDD frame timing and channel allocation is as follows: A node computes its framing and timing for the communication with node that is going to receive a route reply message. The node adds this information into TDD info in RREP message. There may be multiple solutions available and the node receiving RREP has to send RELAYTYPE message if the first solution on the list is not acceptable.

Since certain changes may be made in the above described system and method for a cognitive TDD mobile ad-hoc network without departing from the scope of the invention herein involved, it is intended that all matter contained in the description thereof or shown in the accompanying figures shall be interpreted as illustrative and not in a limiting sense.

A cognitive MANET system is disclosed that uses TDD (Time Division Duplexing) and TDMA MAC to maintain routes that allow delivery of adequate bandwidth for applications resulting in an efficient way of maintaining information on neighboring wireless terminals and access points by using a routing protocol that has a built in slot reservation algorithm.

What is claimed is:

1. A method using a Media Access Control message framing protocol having super frames and mobile nodes to create a cognitive mobile time division duplex Ad-Hoc network for sending message packets from originating mobile nodes to message packet destination mobile nodes comprising;

first, said Media Access Control message framing protocol super frame being divided into two frames times wherein a first frame time can operate in a master mode while a second frame time can operate in a slave mode;

then, wherein each of said frame times can operate on different channels and the frame assignment order of transmit and receive timeslots of said first frame time and said second frame time can be dynamically changed in each of said mobile nodes depending on with which of each said message packet destination mobile nodes each of said originating mobile nodes is communicating;

said super frame having a timeslot reserved for randomly transmitted beacon messages;

then, each mobile node of said mobile nodes having a routing table that contains time division duplex frame and channel information for message packet destinations associated with said mobile node;

then, each said mobile node having a neighbor table that contains time division duplex frame and channel information for all potential or previously used mobile node destinations wherein said neighbor table time division duplex frame and channel information is updated by each said mobile node using beacon messages sent by other mobile nodes within transmission range of said updating mobile node; and, then, each of said mobile nodes operating as both a master mobile node coordinating time slot allocations and channel access over a transmission area and a slave mobile node being coordinated by a master mobile node.

2. The method using said Media Access Control message framing protocol of claim 1 further comprising;

then, each of said originating mobile nodes, when originating a request for a transmission route for a message packet, sending a route request message to a destination mobile node with a time division duplex frame and channel information field having one or more elements that contain available frame timing and frequency channels wherein said time division duplex frame and channel information contains one or more elements when sent by said originating mobile node and two or more elements when said route request message is forwarded by a mobile node forwarding said route request message to said destination mobile node; and, then, when a message packet route is determined, a route reply message being sent from said destination mobile node back to said originating mobile node and said time division duplex frame and channel information contained in said elements being used to update said routing table of said mobile nodes along the determined message packet route.

3. The method using said Media Access Control message framing protocol of claim 1 further comprising;

using proxy hello messages wherein when a slave mobile node is associated to a master mobile node said slave mobile node can request a proxy hello message from a master mobile node containing a list of all the mobile nodes that are in communication with the master mobile node allowing for a reduction of search time for potential neighbor mobile nodes to use in a message packet route.

4. The method using said Media Access Control message framing protocol of claim 1 further comprising;

a scan message being used by said master mobile node to notify said slave mobile nodes that said master mobile node is not communicating for a number of frames or seconds.

* * * * *